Jan. 23, 1934.  R. E. LANGILL  1,944,287
SAWMILL DOG
Filed Sept. 16, 1925  6 Sheets-Sheet 1

INVENTOR :
ROSS E. LANGILL.

By Bottum, Hudnall, Secher and McNamara,
ATTORNEYS.

Jan. 23, 1934.   R. E. LANGILL   1,944,287
SAWMILL DOG
Filed Sept. 16, 1925   6 Sheets-Sheet 2

INVENTOR:
ROSS E. LANGILL

By Bottum, Hudnall, Secher and McNamara.
ATTORNEYS.

Jan. 23, 1934.    R. E. LANGILL    1,944,287
SAWMILL DOG
Filed Sept. 16, 1925    6 Sheets-Sheet 3

INVENTOR:
ROSS E. LANGILL
By Bottum, Hudnall, Secher and McNamara.
ATTORNEYS.

Jan. 23, 1934.　　　R. E. LANGILL　　　1,944,287
SAWMILL DOG
Filed Sept. 16, 1925　　　6 Sheets-Sheet 5

INVENTOR:
ROSS E. LANGILL
By Bottum, Hudnell, Secher and McNamara.
ATTORNEYS.

Jan. 23, 1934.  R. E. LANGILL  1,944,287
SAWMILL DOG
Filed Sept. 16, 1925    6 Sheets-Sheet 6

INVENTOR:
ROSS E. LANGILL
By Bottum, Hudnall, Secher and McNamara.
ATTORNEYS.

Patented Jan. 23, 1934

1,944,287

UNITED STATES PATENT OFFICE 1,944,287

SAWMILL DOG

Ross E. Langill, Menominee, Mich., assignor to The Prescott Company, Menominee, Mich., a corporation of Michigan Application September 16, 1925
Serial No. 56,590

11 Claims. (Cl. 143—125)

This invention relates to improvements in sawmill dogs.

In sawing a log into boards, the log is placed upon a suitable carriage and held in position thereon for movement through the saw by means of what are commonly known as boss dogs which comprise, in general, a knee, a series of teeth pivotally mounted in the latter and adapted to be receded within the same and to be projected outwardly beyond the face of the knee to bite into one side of the log or into the face board of a cant to hold the latter securely in position. The objection to a boss dog is that the teeth thereof bite into the face board and mar the latter so that the same is of a much lower grade than it would otherwise be if no marks made by the dog teeth were present. In sawing valuable timber, therefore, the loss caused by this marring of the face board by the teeth of the boss dogs is considerable. Some types of boss dogs are provided with a series of teeth slidably mounted in a vertical bar supported by the knee for movement in a vertical plane, so that when a cant or beam is placed against the knee the teeth which would otherwise bite into the face board are pushed inwardly and do not engage the lumber, the tooth of the series which is above the lumber biting into the upper side thereof upon downward movement of the vertical bar whereby the lumber is held securely against the face of the knee. A lower tooth is also provided which moves upwardly above the head block upon downward movement of the vertical bar and engages the underside of the lumber. The teeth of these dogs may be adjusted by hand so that they project varying distances beyond the face of the knee for gripping logs or irregular pieces, but this manual adjustment is too slow for present day sawmill practice. It has been proposed to substitute for the usual teeth found in the boss dog upper and lower tong or log-holding arms arranged substantially in horizontal planes and provided with teeth at the front ends thereof projecting beyond the face of the knee and arranged to bite into the upper and under sides of the log or cant to hold the same securely in position upon the log carriage and against the face of the knee, these tong arms being guided for movement with respect to the knee in a vertical plane in such manner that the teeth thereof move parallel to the face of the knee, suitable mechanism being provided to move the tong arms toward each other so that the teeth are forced into the upper and under sides of the log or cant to securely hold the same in position. The tong arms of these so-called tong dogs, while they grip or hold a cant or beam without marring the face board, extend at all times the same distance beyond the face of the knee and are not adapted to be receded or moved forward a further distance beyond the face of the knee for holding logs or beams of different dimensions in the same manner as the teeth of the boss dogs. In tong dogs constructed heretofore, the thinness to which the last board may be cut depends, therefore, upon the distance which the teeth of the tong arms extend beyond the face of the knee, which distance is fixed and cannot be varied.

One of the objects of the present invention, therefore, is to provide an improved sawmill dog of the tong type with tong or log-holding arms adapted to be extended varying distances beyond the face of the knee to hold logs or beams of varying dimensions whereby a tong dog is provided which has the same flexibility as the boss dogs used heretofore as regards adjustment of the teeth in a direction transverse to the faces of the knees.

Another object is to provide an improved sawmill dog of the tong type with improved actuating mechanism for effecting the various movements of the tong arms and housings for supporting and enclosing parts of the mechanism to prevent accumulation of sawdust and other foreign matter in the latter.

Another object is to provide an improved sawmill dog of the tong type which has advantages over those constructed heretofore as regards simplicity of construction, adjustability, ease of operation and durability.

Other objects and advantages will hereinafter appear.

For the purpose of illustrating the invention an embodiment thereof is shown in the drawings, in which.

The improved sawmill dog is provided with a knee 1 having a face 2 and a base 3 slidably mounted in the usual manner upon the head block 4 for transverse movement with respect to the log carriage by means of a pinion 5 keyed to the set-shaft 6 and arranged in mesh with the setting rack 7 connected by means of a link 8 to the usual nut 9 threaded upon a screw 10 journaled in the base of the knee and rotated in either direction by mechanism hereinafter described, nut 9 and screw 10 effecting movement of the knee with respect to rack 7 to adjust the dog for cutting on a taper.

Figure 1:
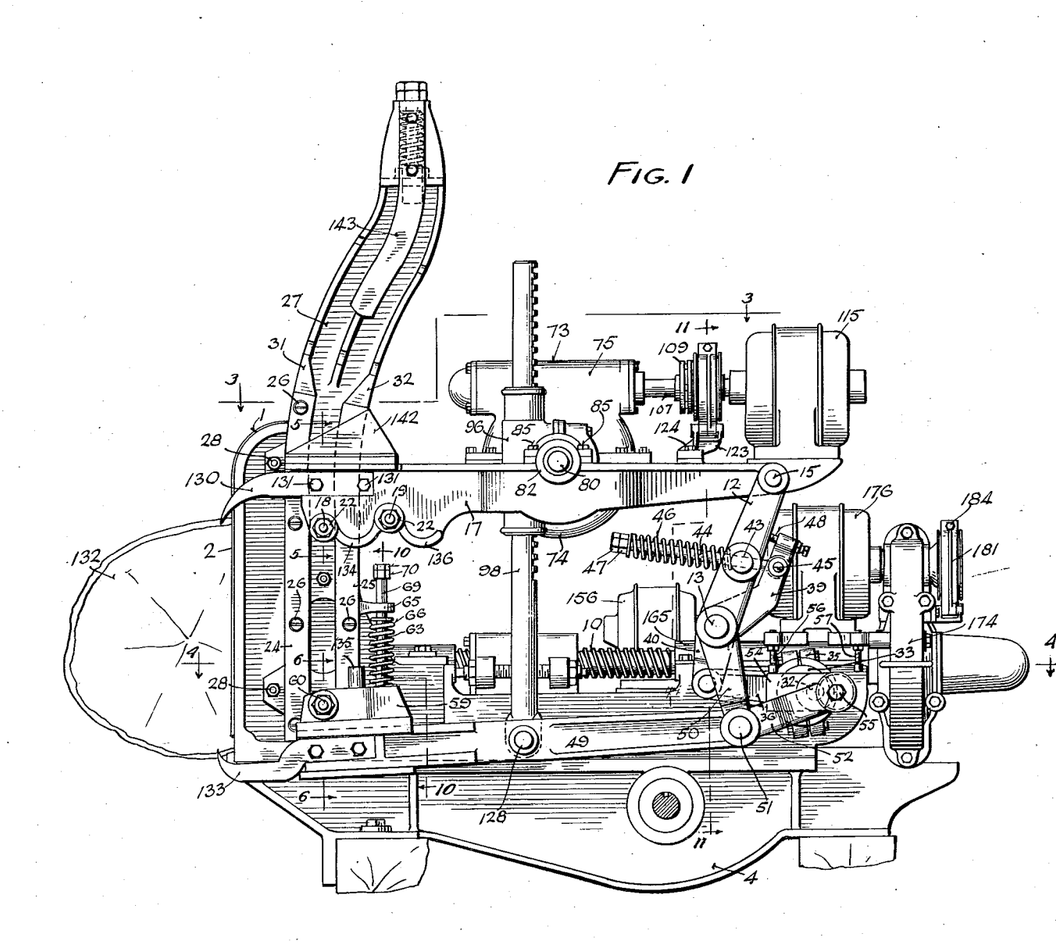
Figure 1 is a side elevation, looking toward the left in Fig. 3.
Figure 3:
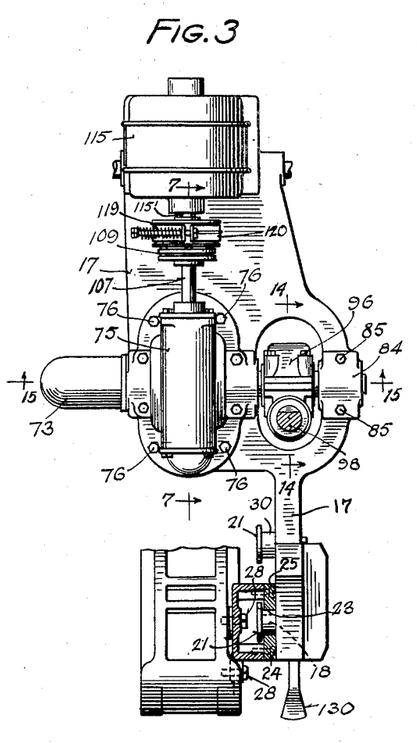
Fig. 3 is a section on line 3—3 of Fig. 1.

Arms 11 and 12 are keyed to the ends of a rocker shaft 13 journaled in a bearing 14 which may be formed integrally with the base of knee 1, the upper ends of arms 11 and 12 receiving the ends of a shaft 15 which passes loosely through bearings 16 formed on the underside of the upper tong arm 17 whereby the rear end of the latter is pivotally connected to and supported by arms 11 and 12. Pins 18 and 19 are provided with reduced ends 20 which pass through tong arm 17 and with heads 21, the pins being held in position by means of nuts 22 threaded upon the ends thereof. Pins 18 and 19 are selectively adapted for sliding movement in a channel 23 formed by means of strips 24 and 25 arranged in parallel relation to each other and to the face of the knee 1 and secured by means of bolts 26 to a vertical member 27, member 27 being secured to one side of knee 1 by means of bolts 28. As shown in Fig. 3, the adjacent edges of strips 24 and 25 fit loosely between arm 17 and head 21 of pin 18 whereby the latter is held in position in channel 23 for sliding movement along the same. Pins 18 and 19 may be provided with collars 29 which loosely fit the pins and provide for a rolling action between the same and strips 24 and 25 upon movement of tong arm 17 in a vertical plane. The respective upper ends 31 and 32 of strips 24 and 25 are beveled outwardly, as shown in Fig. 1, for the purpose hereinafter explained.

Figures 15, 16:
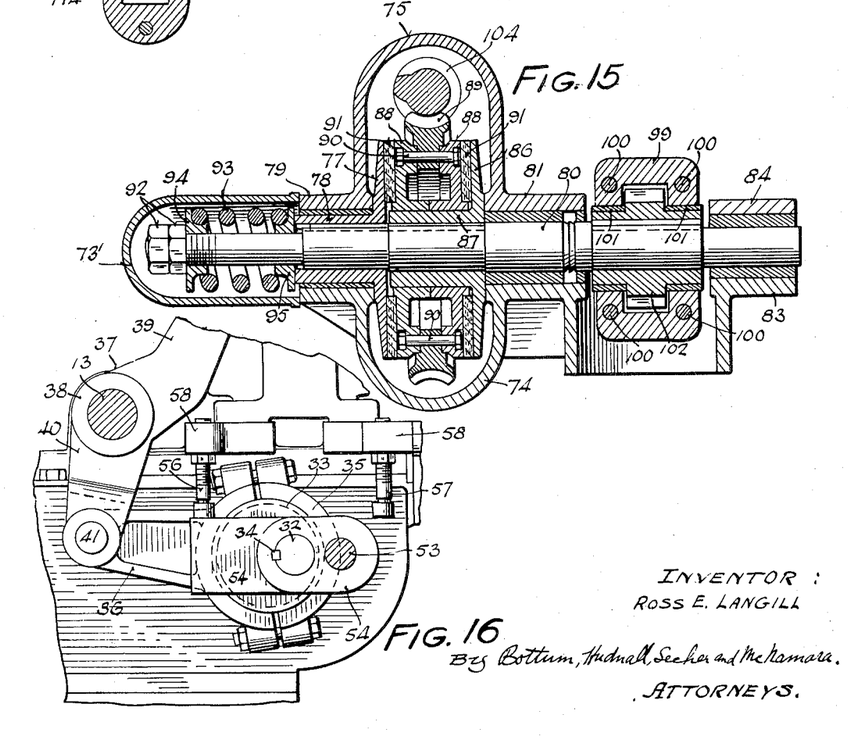
Fig. 15 is an enlarged section on line 15—15 of Fig. 3.
Fig. 16 is an enlarged, fragmentary view taken from Fig. 1.

A shaft 32 is journaled in base 3 of knee 1 at the rear end thereof and provided with an eccentric 33 fixed thereto by means of a key 34, an eccentric sheave 35 having an arm 36 being arranged upon eccentric 33, as more clearly shown in Fig. 16. A lever 37 comprising a collar 38 and arms 39 and 40 fixed thereto is pivotally mounted intermediate its ends on the rocker shaft 13 which extends loosely through collar 38, the lower end of arm 40 being bifurcated and pivotally connected to the end of arm 36 by means of a pin 41. Arm 12 is enlarged at the center thereof to form a frame 42 in which an apertured pin 43 is pivotally mounted, as more clearly shown in Fig. 11, a bolt 44 passing through pin 43 and being pivotally connected at 45 to arm 39 of lever 37. A spring 46 is arranged upon bolt 44 and held slightly compressed between pin 43 and nuts 47 threaded upon the end of bolt 44. An adjustable bolt 48 is threaded into the end of arm 39 and engages the adjacent edge of arm 12 for the purpose hereinafter explained.

The rear end of the lower tong arm 49 fits into the lower bifurcated end of a hanger 50 having its upper end loosely mounted on rocker shaft 13 and is pivotally connected to the lower end of hanger 50 by means of a pin 51, hanger 50 thereby supporting the rear end of tong arm 49. One end of a link 52 also fits into the lower bifurcated end of hanger 50 and is also pivotally connected thereto by means of pin 51, the other end of link 52 being loosely mounted on an eccentric or crank pin 53 fixed in a lug 54 which may be formed integrally with eccentric 33, this end of link 52 being held upon pin 53 by any suitable means such as a nut 55 threaded upon the end of the latter. Adjustable stops or bolts 56 and 57 are threaded into lugs 58 which may be cast integrally with the base 3 of knee 1 and are arranged, as shown in Fig. 16, to engage the opposite sides of block 54 to limit rotary movement of shaft 32 through an angle of 180 degrees for the purpose hereinafter explained.

Figure 4:
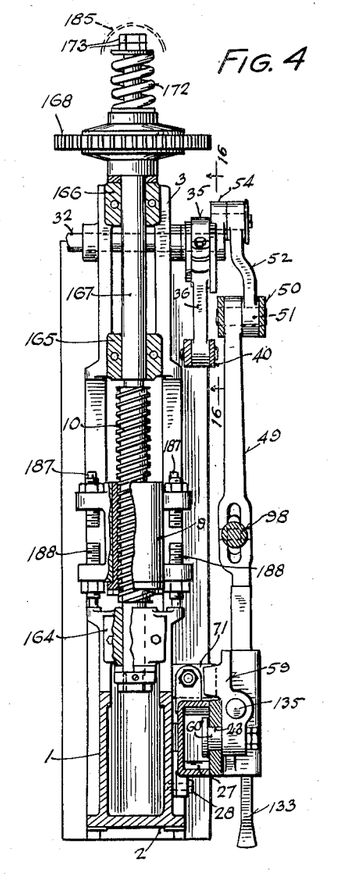
Fig. 4 is a section on line 4—4 of Fig. 1.
Figure 5:
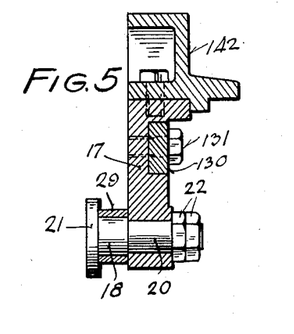
Fig. 5 is an enlarged section on line 5—5 of Fig. 1.
Figure 6:
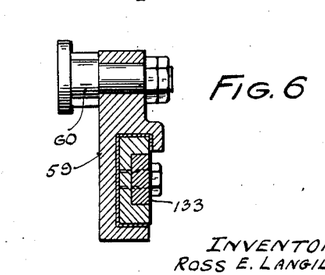
Fig. 6 is an enlarged section on line 6—6 of Fig. 1.
Figure 10:
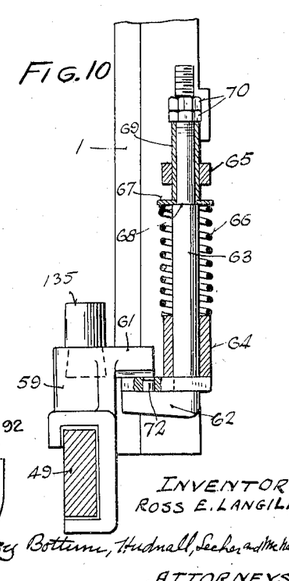
Fig. 10 is an enlarged section on line 10—10 of Fig. 1.

The forward end of tong arm 49 is slidably mounted in a shoe 59 provided with a pin 60 which is similar to pins 18 and 19 and is arranged in channel 23, as shown in Fig. 4, for sliding movement along the same. As more clearly shown in Figs. 1 and 10, shoe 59 is provided with a lug 61 arranged to engage with the head 62 of bolt 63 loosely mounted in lugs 64 and 65 cast integrally with member 27, a spring 66 being arranged on bolt 63 between lug 64 and a washer 67 held between a shoulder 68 in the bolt and a sleeve 69 fitted upon the latter and held in position by means of nuts 70 threaded upon the end of the bolt. One edge of a plate 71, arranged upon bolt 63, as shown, fits against the adjacent face of knee 1 and is provided with an opening to receive a pin 72 fixed in head 62 of bolt 63, the engagement of plate 71 with knee 1 and its connection by means of pin 72 with the head of bolt 63 acting to hold the latter against rotary movement in lugs 64 and 65 whereby the head of the bolt and plate 71 associated therewith are always in the position shown in Fig. 10 for engagement with lug 61 of shoe 59, bolt 63 thereby acting as a stop to support the forward end of tong arm 49 when the latter is in its lowermost position, spring 66 being compressed upon engagement by lug 61 with plate 71 and thus acting as a cushion.

Figure 2:
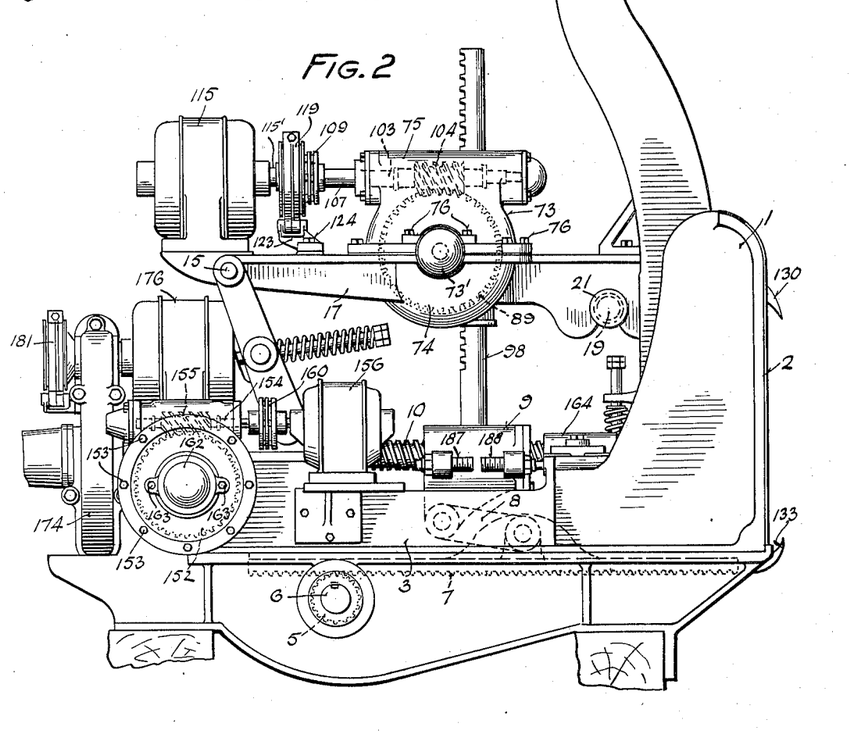
Fig. 2 is a side elevation, looking toward the right in Fig. 3.

The mechanism for effecting movement of tong arms 17 and 49 in a vertical plane will now be described. Referring more particularly to Figs. 1, 2 and 15, the upper tong arm 17 is provided with a housing 73, the lower part 74 of the housing being cast integrally with arm 17 while the upper part 75 of the housing is formed separately, being fitted over and secured to the lower part 74 by means of bolts 76. A plate 77 is provided with a collar 78 journaled in bearing 79 of housing 73 and is splined on a shaft 80 journal in bearing 81 of the housing and a bearing 82, part 83 of bearing 82 being cast integrally with tong arm 17 while the upper part 84 of this bearing is formed separately and fitted over and secured to the lower part 83 by means of bolts 85. A plate 86, similar to plate 77, is provided with a collar 87 also splined on shaft 80 and upon which are loosely mounted the parts 88 between which a worm gear 89 is fitted, parts 88 and gear 89 being held in assembled relation for rotation together upon collar 87 by means of bolts 90. Friction discs 91 are arranged between parts 88 and plates 77 and 86 whereby worm gear 89 is yieldably connected to shaft 80 for rotation therewith, the amount of frictional engagement between the friction discs 91 and parts 88 and plates 77 and 86 being adjusted by means of nuts 92 threaded upon the end of shaft 80 and acting to hold the spring 93 compressed between collar 94 and the collar 95 engaging the end of collar 78 of plate 77, as shown. A housing 96 is provided with a part 97 through which a rack 98 loosely passes and a cap 99 secured to part 97 by means of bolts 100, part 97 and cap 99 of housing 96 fitting together to provide bearings for the reduced ends 101 of a pinion 102 keyed to shaft 80 and arranged in mesh with rack 98. By constructing housing 96 in this manner the latter acts to hold rack 98 and pinion 102 in proper assembled relation and against bodily movement toward or away from each other whereby engagement of the teeth of the rack and pinion at the pitch line is maintained at all times, the housing further acting to enclose and protect pinion 102 and that portion of rack 98 in mesh therewith and to prevent the accumulation of sawdust and other foreign matter at this point. A cap 73' is placed over the end of shaft 80, as more clearly shown in Fig. 15, and is secured in any suitable manner to housing 73.

Figure 7:
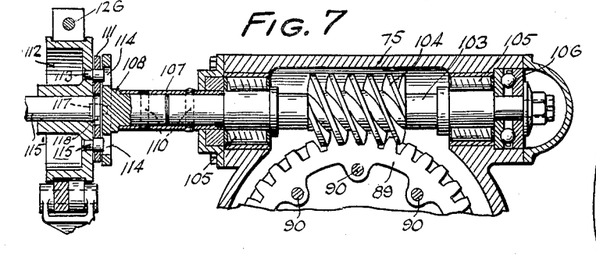
Fig. 7 is an enlarged section on line 7—7 of Fig. 3.
Figures 11, 12:
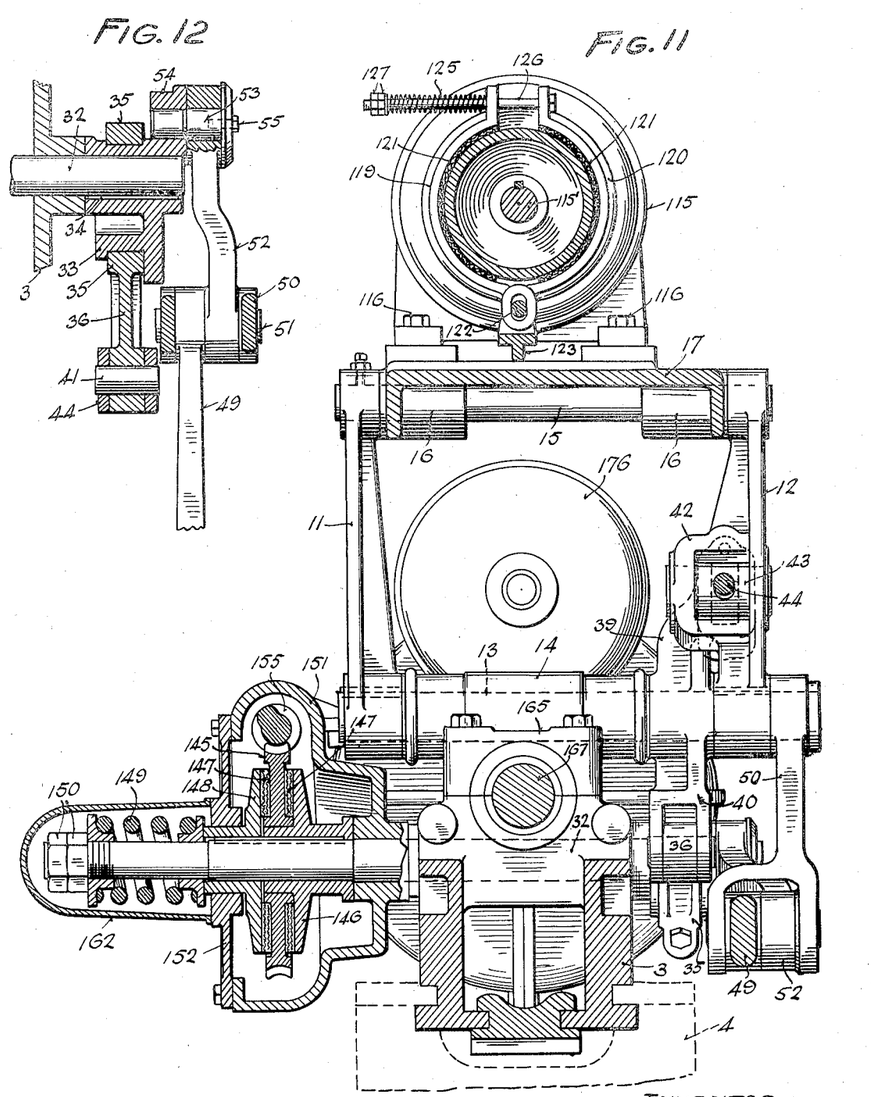
Fig. 11 is an enlarged section on line 11—11 of Fig. 1.
Fig. 12 is an enlarged section on line 12—12 of Fig. 1.

Referring to Fig. 7, a shaft 103 provided with a worm 104 arranged in mesh with worm gear 89 is journaled in bearings 105 in the upper part 75 of housing 73, one end of shaft 103 being provided with a suitable thrust bearing 106 and the other end of the shaft being connected by means of a sleeve 107 to the part 108 of a suitable coupling 109, pins 110 passing through sleeve 107 and part 108 and the adjacent end of shaft 103. The other part 111 of coupling 109 is secured to a drum 112 for rotation therewith by means of the pins 113 which extend into openings 114 in part 108 whereby the latter is fixed for rotation with part 111 and drum 112, the drum being keyed to the armature shaft 115' of a suitable reversible motor such as a direct current electric motor 115 mounted upon tong arm 17 at the rear end of the latter and secured thereto by means of bolts 116. Pins 117 may also be fixed in part 108 and inserted into openings 118 in part 111 of the coupling to act with pins 111 for connecting the parts of the coupling for rotation together. This type of coupling facilitates assembling of the parts, the parts 111 and 108 of the coupling being simply fitted together, as shown in Fig. 7, so that the pins 113 and 117 enter into the respective openings 114 and 118. Brake members 119 and 120 are provided with friction faces 121 and are pivotally connected at their lower ends by means of a pin 122 to a bracket 123 secured to tong arm 17 by means of bolts 124, the brake members fitting about drum 112, as shown in Fig. 11, and being held in engagement therewith by means of a spring 125 arranged upon a bolt 126 extending loosely through the upper ends of members 119 and 120, the spring being held in compression between the upper end of member 119 and nuts 127 threaded upon the end of bolt 126. Parts 119 and 120 comprising the friction brake are so adjusted as to place an initial load upon motor 115 equal in amount, approximately, to the difference between the load for which the motor is designed and the load placed thereon when the motor operates tong arms 17 and 49 to grip or hold the log. The motor 115 has considerably more power than is necessary to effect movement of the tong arms toward and away from each other and is prevented from running away and moving the tong arms at too great a rate by the friction brake just described. The lower end of rack 98 is pivotally connected by means of a pin 128 to lower tong arm 49 at substantially the center thereof, as shown in Fig. 1.

Assuming that the parts are in their respective positions as shown in Fig. 1, it will be seen from the foregoing description that upon operation of motor 115 in one direction the worm 104 through worm gear 89 will rotate shaft 80 and pinion 102 keyed thereto and that shaft 80 may thereby be rotated in a clockwise direction, as viewed in Fig. 1, to cause pinion 102 to travel downwardly along rack 98 to effect downward movement of tong arm 17 in a vertical plane about shaft 15 as a center, pin 18 sliding downwardly along slot 23. The upper end of slot 23 is curved on the arc of a circle having shaft 15 as a center to permit arm 17 to move about the latter as a center during sliding movement of pin 18 in the upper end of slot 23. Downward movement of pin 18 in slot 23 below the position of the pin shown in Fig. 1 will cause arm 12 to move forward slightly in a counter-clockwise direction about shaft 13 as a center and spring 46 to be compressed between pin 43 and nuts 47. When tooth 130 engages log 132 tong arm 17 and pinion 102 carried thereby will be held against further downward movement. Upon continued rotation of pinion 102, therefore, rack 98 will be drawn upwardly through housing 96 to pull lower tong arm 49 upwardly and cause the tooth 133 secured to the latter to be embedded in the underside of the log, tong arm 49 being moved upwardly until the teeth 130 and 133 are embedded in the log with the same force, at which time worm gear 89 and the parts 88 secured thereto will slip completely with respect to shaft 80 by reason of their connection with the latter through the friction discs 91.

When the sawyer observes that the tong arms have been moved together a sufficient amount to grip or hold the log, he shuts down motor 115. When the log is to be released, motor 115 is reversed to move the tong arms 17 and 49 away from each other.

If it is desired to project teeth 130 and 133 a greater distance beyond the face of knee 1 to hold a comparatively large log, motor 115 is operated to move tong arm 17 upwardly until pin 18 is above the upper ends 31 and 32 of strips 24 and 25 and beyond channel 23 formed by the latter. Shaft 32 is then rotated by means hereinafter described in a counter-clockwise direction, as viewed in Figs. 1 and 16, until block 54 engages stop 57, stop 57 being adjusted to permit rotation of shaft 32 through 180 degrees from the position thereof shown in Figs. 1 and 16. Lever 37 will thus be rotated in a counter-clockwise direction about rocker shaft 13 and cause bolt 48 to act against the adjacent edge of arm 12 to move tong arm 17 forward, the eccentricity of eccentric 33 and the relation between arms 39 and 40 of lever 37 being such that pin 19 is moved into alignment with slot 23 for sliding movement therein. At the same time, crank pin 53 will also move through 180 degrees from the position thereof shown in Figs. 1 and 16, and thus cause tong arm 49 to slide in shoe 59 in a direction transverse to the face of knee 1, tooth 133 thereby being projected forward beyond the face of knee 1 a distance equal substantially to the throw of crank pin 53, this distance being equal to the distance which tooth 130 is projected beyond the face of the knee, or in other words, the distance between pins 18 and 19. As shown in Fig. 1, the hanger 50 is angularly disposed to the right of the vertical through rocker-shaft 13 so that during the movement of crank pin 53 in a counter-clockwise direction through the first 90 degrees, pin 51 will move downwardly to compensate for the upward movement of pin 53. In this connection it will be seen that if the rear end of lower tong arm 49 were connected directly to crank pin 53, as shown in the modified form in Fig. 17, the rear end of the tong arm would be moved upwardly with pin 53 and cause arm 49 to tilt a considerable amount about pin 128 as a center. The parts are so arranged that when pin 53 reaches its uppermost position pin 51 is in its lowermost position. During movement of pin 53 in a counter-clockwise direction through the last 90 degrees, therefore, the latter will move downwardly, but pin 51 will compensate for this movement by moving upwardly about shaft 13 as a center. By employing the hanger 50 and connecting the rear end of tong arm 49 to crank pin 53 by means of link 52, therefore, rotary movement of tong arm 49 in a vertical plane about pin 128 as a center upon rotation of shaft 32 is minimized, arm 49 being thereby maintained in substantially a horizontal plane during movement thereof in a direction transverse to the face of knee 1.

Figure 8:
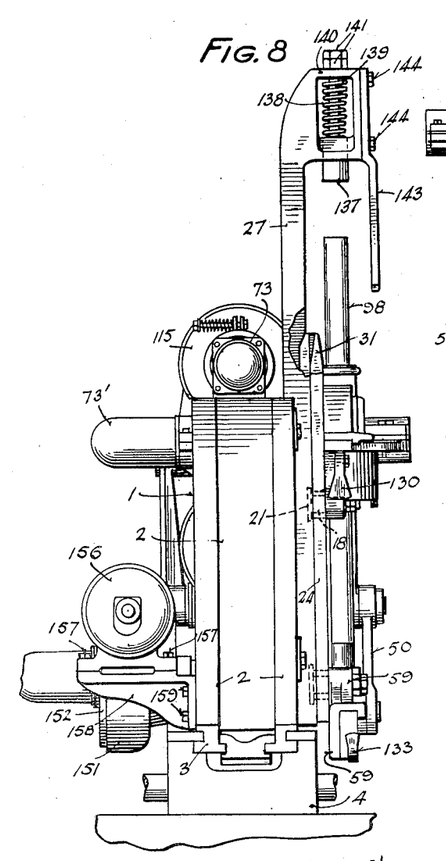
Fig. 8 is an end elevation, looking toward the right in Fig. 1.
Figure 9:
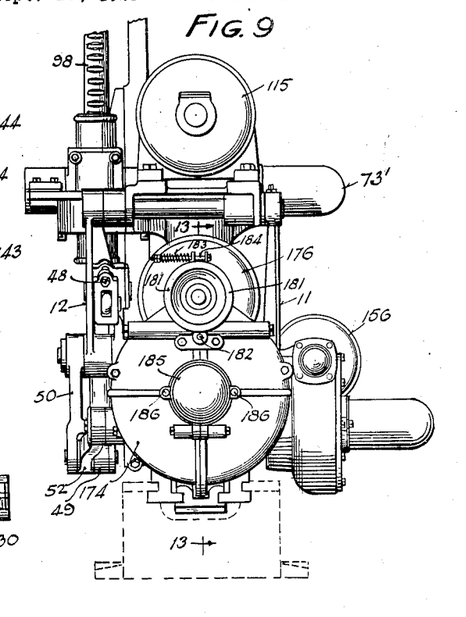
Fig. 9 is a rear elevation, looking toward the left in Fig. 1.

The upper tong arm 17 may be provided on the underside thereof with a stop 134 arranged to engage a rubber bumper 135 with which shoe 59 is provided when pin 18 is in slot 23 and with a stop 136 arranged to engage bumper 135 when pin 19 is in slot 23 to limit relative movement of the tong arms toward each other. A pin 137 is slidably mounted in the upper end of member 27 and backed by a spring 138 arranged upon a bolt 139 secured to pin 137 and extending loosely through the upper portion 140 of member 27, nuts 141 being threaded upon the end of bolt 139 to limit downward movement of pin 137. A block 142 is secured to the upper side of tong arm 17 and arranged to engage pin 137, the latter thereby acting as a cushion and a stop to limit upward movement of the tong arm. An arm 143 may be secured to member 27 by means of bolts 144 and arranged as shown in Figs. 1 and 8 to prevent movement of the forward end of tong arm 17 away from member 27 when either of the pins 18 and 19 are moved to a position above the upper ends 31 and 32 of strips 24 and 25 forming the channel 23, ends 31 and 32 being beveled outwardly, as explained above, to facilitate entrance of pins 18 and 19 into channel 23.

When the teeth 130 and 133 are extended to the fullest extent beyond the face of knee 1, in which position of the teeth pin 19 of upper tong dog 17 will be in channel 23 and crank pin 53 will be in its extreme position to the left of the shaft 32 and block 54 against stop 57, the teeth may be receded by operating motor 115 to raise tong arm 17 and carry pin 19 above the upper end of channel 23. Shaft 32 is then rotated in a clockwise direction, as viewed in Figs. 1 and 16, which movement of shaft 32 will carry upper tong arm 17 backward a distance equal to the distance between pins 18 and 19 to place pin 18 in alignment with channel 23. Spring 46 is stiff enough so that upon movement of arm 39 to the right, as viewed in Fig. 1, the spring will be only slightly compressed and act upon pin 43 to carry arm 12 and tong arm 17 connected thereto backward. This rotation of shaft 32 in a clockwise direction until block 54 engages stop 56 will also cause lower tong arm 49 to slide backward in shoe 59 a distance equal to the distance between pins 18 and 19 whereby teeth 130 and 133 are receded the same amount to the respective positions thereof shown in Fig. 1, in which position of the teeth the log is held to cut the thinnest board.

The means for rotating shaft 32 in either direction will now be described. Referring more particularly to Figs. 2 and 11, a worm gear 145 is loosely mounted on a member 146 splined to shaft 32 and held in frictional engagement by friction discs 147 with a member 148 also splined on shaft 32, a spring 149 being held in compression between member 148 and adjustable nuts 150 threaded upon the end of shaft 32 to hold gear 145, friction discs 147 and members 146 and 148 in proper frictional engagement with each other. A suitable housing 151 for these friction elements may be arranged upon shaft 32, as shown, and closed by a plate 152 secured to the housing by bolts 153, the housing being provided with suitable bearings for a shaft 154 having a worm 155 arranged in mesh with worm gear 145. A reversible electric motor 156 is secured by means of bolts 157 to a bracket 158 secured, in turn, to knee 1 by means of bolts 159. A coupling 160 of the same type as coupling 109 described above and shown in Figs. 1 and 7 connects shaft 154 to the armature shaft of motor 156 for rotation therewith. Upon operation of motor 156 in a given direction shaft 32 will be rotated in a counter-clockwise direction to advance or extend teeth 130 and 133 further beyond the face of knee 1 until block 54 engages stop 57, as explained above, at which time worm gear 145 will slip completely with respect to shaft 32 to permit continued operation of motor 156. When the teeth have been advanced in this manner motor 156 is shut down. Upon reversal of motor 156 shaft 32 is rotated in a counter-clockwise direction to recede the teeth 130 and 133 to their respective positions as shown in Fig. 1, block 54 engaging stop 56 when the shaft has rotated through 180 degrees, at which time worm gear 145 will again slip completely with respect to shaft 32 to permit continued operation of motor 156 which may then be shut down. A cap 162 may be placed over the end of shaft 32 and secured to plate 152 by means of bolts 163.

Figure 13:
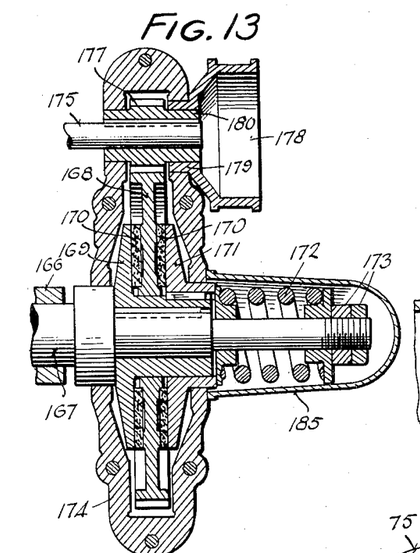
Fig. 13 is an enlarged section on line 13—13 of Fig. 9.
Figure 14:
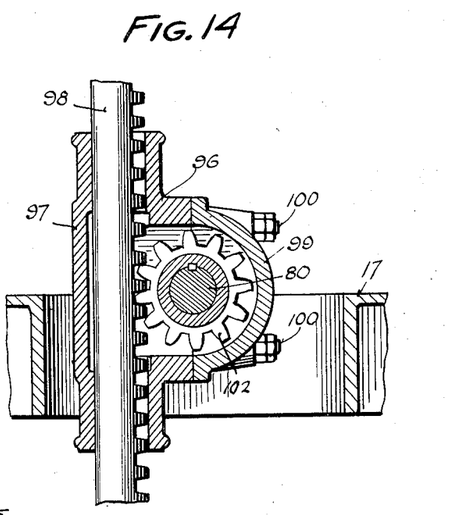
Fig. 14 is an enlarged section on line 14—14 of Fig. 3.

Referring more particularly to Figs. 4 and 13, the base 3 of knee 1 is provided with suitable bearings 164, 165 and 166 for screw 10 and a shaft 167 which may be integral with the latter, a spur gear 168 being loosely mounted on a member 169 splined on shaft 167 and held in frictional engagement by means of friction discs 170 with member 169 and a member 171 splined on the latter, as shown in Fig. 13, a spring 172 being held in compression between member 171 and adjustable nuts 173 threaded upon the end of shaft 167 to hold the parts in proper frictional engagement with each other. A suitable housing 174 may be arranged upon shaft 167, as more clearly shown in Fig. 13, to enclose and protect spur gear 168 and the parts associated therewith, the housing also providing a bearing for the armature shaft 175 of a reversible electric motor 176 mounted upon the base of knee 1. A pinion 177 is keyed to shaft 175 and arranged in mesh with spur gear 168. A drum 178 is provided with a portion 179 journaled in housing 174 and having a press fit on the reduced portion 180 of pinion 177. Brake members 181, which are similar to brake members 119 and 120 shown in Fig. 11 and described above, are pivotally connected to housing 174 at 182 and are fitted over drum 178 and held in frictional engagement therewith by means of a spring 183 arranged upon a bolt 184, brake members 181 thereby placing an initial load on motor 176. A cap 185 may be placed over the end of shaft 167 and secured to housing 174 by means of bolts 186. Nut 9 is provided with adjustable stops 187 arranged to engage bearing 165 and similar adjustable stops 188 arranged to engage bearing 164.

From the foregoing it will be seen that upon rotation of motor 176 in a given direction screw 10 will be rotated in a corresponding direction to cause knee 1 to move forward with respect to setting rack 7 due to the coaction of the threads on screw 10 and those on nut 9 which is fixed against movement with respect to rack 7 by means of link 8. Upon engagement of stops 188 with bearing 164 spur gear 168 will slip completely with respect to shaft 167 to permit continued operation of motor 176. After the desired tapering movement of knee 1 has been effected, motor 176 is shut down, brake members 181 acting upon drums 178 to hold screw 10 in set position. Upon reversal of motor 156 knee 1 will be moved backward with respect to rack 7, this movement being limited by engagement of stops 187 with bearing 165, at which time spur gear 168 will again slip completely with respect to shaft 167 to permit continued operation of motor 176.

Figure 17:
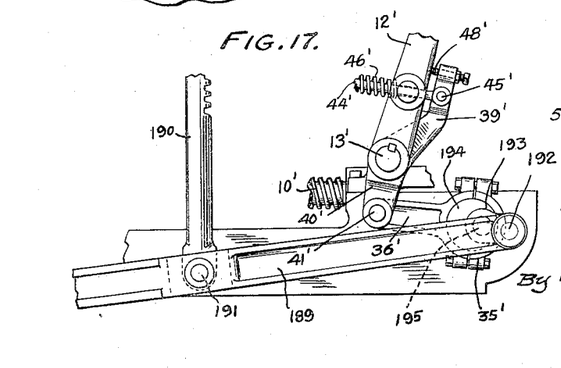
Fig. 17 is a view similar to Fig. 16, showing a modified form.

As shown in Fig. 17, the rear end of the lower tong arm 189 to which the lower end of the rack 190 is pivotally connected by the pin 191 may be pivotally connected by the pin 192 to a lug 193 formed integrally with the eccentric 194, the latter being fixed on the operating shaft 195, corresponding to shaft 32 in Figs. 1 and 16, the lug 193 corresponding to the lug 54. It will therefore be seen that in the modification shown in Fig. 17 there has been omitted the hanger 50 and the link 52. The remaining parts shown in Fig. 17 are identical in construction and manner of operation as the corresponding parts shown in Fig. 1, and are designated by primed reference numerals similar to the reference numerals of the corresponding parts shown in Fig. 1.

From the foregoing it will be seen that an improved sawmill dog of the tong type has been provided in which the tong or log-holding arms are adapted for movement in a vertical plane toward and away from each other and also for movement in substantially horizontal planes in a direction transverse to the face 2 of knee 1, and that the reversible motor 115 and the mechanism driven thereby causes the movement of the tong arms 17 and 49 in a vertical plane toward and away from each other, that the reversible motor 156 and the mechanism associated therewith causes movement of the tong arms in a direction transverse to the face of knee 1, and that the reversible motor 176 and the mechanism associated therewith operates the taper mechanism for the knee comprising nut 9 and screw 10. It will further be seen that the various gears and parts coacting therewith are entirely enclosed and protected and that the improved dog has many advantages over those constructed heretofore as regards flexibility of operation, simplicity of construction and durability.

A preferred embodiment of the invention has been shown and described, but of course many changes may be made in the size, shape and arrangement of the parts without departing from the spirit of the invention or the scope of the claims.

As used in this specification and in the claims, the term "power" signifies mechanical motive power such as electricity, steam, compressed air, and the like, as distinguished from hand power or work done by hand.

The invention claimed is:

1. In a sawmill dog, a knee having a face, upper and lower log-holding arms associated with said knee with their log-engaging ends arranged adjacent the knee face, means associated with said knee and said ends for supporting the latter for vertical movement relative to each other and for movement transverse to the knee face, said supporting means including a shoe slidable vertically with respect to said knee and receiving one of said ends for sliding movement with respect to itself transversely of the knee face, second supporting means mounted for rocking movement in a direction transverse to the knee face and pivotally connected to said arms, means operable to effect said rocking movement of the second supporting means to simultaneously cause movement of said log-engaging ends varying distances from the knee face, and means operable to effect said relative vertical movement of said log-engaging ends.

2. In a sawmill dog, a knee, having a guideway along one side thereof, a log-holding arm, a shoe having means slidably receiving said arm and a laterally projecting member connected with the shoe and operating in said guide-way to pivotally connect the shoe to the knee.

3. A power sawmill dog of tong type comprising a knee having a face, upper and lower elongated tongs, means coacting with the forward portions of the tongs and with the knee for constraining the tongs to up and down movement toward and away from each other and for movement transverse to the knee face, means for supporting the rearward ends of the tongs at a substantial distance rearwardly of the knee face and in such manner as to permit them to move up and down toward and away from each other and back and forth transverse to the knee face, a reversible rotary motor operatively connected to the tongs for moving the tongs back and forth transversely of the knee face and motor driven means for moving the tongs up and down and toward and away from each other.

4. A power sawmill dog of the tong type comprising a knee having a face, upper and lower elongated tongs, means coacting with the forward portions of the tongs and with the knee for constraining the tongs to up and down movement toward and away from each other and for movement transverse to the knee face, means for supporting the rearward ends of the tongs in vertically spaced relation to each other and for movement toward and away from each other and transversely to the knee face to project forwardly of said face to greater or less distances, the space between said tongs forward of the knee being unobstructed so as to permit the work to engage the face of the knee in all positions of the tongs, power operated means connected with the tongs for moving the tongs transversely back and forth relative to the knee face and power operated means for moving the tongs toward and away from each other in any transverse adjustment.

5. A power sawmill dog of the tong type comprising a knee having a face, upper and lower elongated tongs, means for mounting the forward portions of the tongs on the knee for vertical movement toward and away from each other and for movement transverse to the knee face to project forwardly of said face to greater or less distances, the space between said tongs forward of the knee being unobstructed so as to permit the work to engage the face of the knee in all positions of the tongs, means for pivotally supporting the rearward end of the upper tong a substantial distance rearwardly of the knee face, motor driven means cooperable with the pivotal support for moving the upper tong transversely relative to the knee face, driving and supporting means cooperable with the rearward end of the lower tong for moving the same transversely with respect to the knee face, and motor driven means mounted on the upper tong and cooperable therewith and with the lower tong for moving the tongs toward and away from each other.

6. A power sawmill dog of the tong type comprising a knee having a face, upper and lower elongated tongs associated with said knee, means supporting said tongs in vertically spaced relation to each other throughout their lengths and in such manner as to permit the tongs to be moved toward and away from each other and transverse to the face of said knee to project forwardly of said face to greater or less distances, the space between said tongs forward of the knee being unobstructed so as to permit the work to engage the face of the knee in all positions of the tongs, power means for moving the tongs transversely with respect to the face of the knee, and power means for moving the tongs toward and away from each other.

7. The combination with a knee of a sawmill carriage, of upper and lower opposed log holding members, means for supporting said log holding members for bodily movement vertically of the knee and also for bodily movement transversely of the knee whereby the log holding members may be moved toward and away from each other and into and out of engagement with the log or board and also in and out relative to the knee face so as to be positioned to effectively engage logs or boards, a reversible motor mounted on the log holding members and having driving connections with the log holding members and operable when run forwardly to move the upper log holding members down into engagement with the log or board, then the lower log holding member up into engagement with the log or board and finally to drive both log holding members into the log or board simultaneously and when reversed to move the log holding members away from each other, a reversible motor mounted on the knee, and motion transmission means actuated by the last-named motor and connected to said first-named means for shifting the log holding members in and out relative to the knee face.

8. The combination with a knee of a sawmill carriage having a face, of upper and lower opposed log holding members adapted to be driven into the body of a log or board from above and below, means for supporting said log holding members for bodily transverse and free vertical movements relative to the knee face whereby the log holding members may be projected forwardly of said face to greater or less distances and moved toward and away from each other in any transverse adjustment, a motor interconnected with and supported by said log holding members, said motor being operable in one direction to force the log holding members apart, said motor when operated in the other direction being aided by its own weight together with the weight of the log holding members first to cause the upper log holding member to move downwardly until it engages the log or board whereupon the lower log holding member is moved upwardly until it engages the log or board, both log holding members then being driven in opposite directions to simultaneously drive both into the log or board, a reversible motor mounted on the knee and motion transmission means actuated by said last named motor and connected to said first named means to shift the log holding members and the motor carried thereby in and out relative to the knee face.

9. The combination with a knee of a sawmill carriage having a face, of a dog mounting supported upon the knee for movement toward and away from the face of the knee, upper and lower dogs carried by said mounting, a reversible motor mounted on the knee and operatively connected to the mounting for moving the mounting toward and from the face of the knee to project the dogs to greater or lesser distances forwardly of the knee face, and a reversible motor movable with the dog mounting for actuating the dogs and including two relatively movable parts, one connected to one of the dogs and the other connected to the other of said dogs.

10. The combination with a knee of a sawmill carriage having a face, of a dog mounting supported upon the knee for movement toward and away from the face of the knee, upper and lower dogs carried by said mounting, a reversible motor mounted on the knee and operatively connected to the mounting for moving the mounting toward and from the face of the knee to project the dogs to greater or lesser distances forwardly of the knee face, a reversible motor movable with the dog mounting for actuating the dogs and including two relatively movable parts, one connected to one of the dogs and the other connected to the other of said dogs and cushioning means for absorbing the shock of operation of said last named motor.

11. A power sawmill dog comprising a knee having a guideway extending approximately parallel to the face of the knee, an elongated log holding arm, means supporting the rearward end of the arm for movement up and down and also transversely relative to the knee face, a shoe interconnected with the guideway of the knee for sliding movement therealong and having a transversely extending guideway with which the log holding arm is interconnected for longitudinal sliding movement, reversible motor mechanism for moving the log holding arm up and down and reversible motor mechanism for moving the log holding arm in and out.

ROSS E. LANGILL.